(12) United States Patent
Gamberini et al.

(10) Patent No.: US 8,046,151 B2
(45) Date of Patent: Oct. 25, 2011

(54) INTEGRATED CONTROL SYSTEM FOR AN INTERNAL-COMBUSTION ENGINE OF A MOTORCYCLE PROVIDED WITH A GAS KNOB AND ACQUISITION SYSTEM FOR DETECTING THE ANGULAR POSITION OF A KNOB FOR THE GAS OF A MOTORCYCLE

(75) Inventors: Giuseppe Gamberini, Bologna (IT); Claudio Grossi, Quarto Inferiore (IT); Roberto Piciotti, Bologna (IT); Maurizio Fiorentini, Molinella (IT); Massimo Zanotti, Vado (IT); Loris Lambertini, Crespellano (IT); Stefano Musolesi, Bologna (IT)

(73) Assignee: Magneti Marelli S.p.A., Corbetta (IT)

( * ) Notice: Subject to any disclaimer, the term of this patent is extended or adjusted under 35 U.S.C. 154(b) by 199 days.

(21) Appl. No.: 12/309,117

(22) PCT Filed: Jul. 6, 2007

(86) PCT No.: PCT/IB2007/001867
§ 371 (c)(1),
(2), (4) Date: Oct. 21, 2009

(87) PCT Pub. No.: WO2008/007193
PCT Pub. Date: Jan. 17, 2008

(65) Prior Publication Data
US 2010/0049399 A1    Feb. 25, 2010

(30) Foreign Application Priority Data

Jul. 7, 2006  (EP) .................................... 06425475
Jun. 4, 2007  (EP) .................................... 07425345

(51) Int. Cl.
G06F 19/00    (2006.01)
(52) U.S. Cl. ......................................... 701/103; 701/36

(58) Field of Classification Search ............... 701/34, 701/36, 101, 103, 104; 137/553, 554, 556; 251/263, 294, 129.11
See application file for complete search history.

(56) References Cited

U.S. PATENT DOCUMENTS

| 6,029,510 A * | 2/2000 | Nakaie et al. ............... 73/114.36 |
| 6,341,593 B2 * | 1/2002 | Kamimura et al. ........... 123/337 |
| 6,763,850 B1 | 7/2004 | Jansen et al. .................. 137/554 |
| 7,669,611 B2 * | 3/2010 | Lomicka et al. .............. 137/554 |
| 2005/0007101 A1 | 1/2005 | Fahrlander et al. ......... 324/207.2 |

FOREIGN PATENT DOCUMENTS

| DE | 4103603 A1 | 8/1991 |
| DE | 19626949 A1 | 1/1998 |
| EP | 1338500 A1 | 8/2003 |
| EP | 1541457 A1 | 6/2005 |
| EP | 1553277 A1 | 7/2005 |
| EP | 1600320 A1 | 11/2005 |
| FR | 2570177 A | 3/1986 |
| JP | 4254278 A | 9/1992 |

* cited by examiner

OTHER PUBLICATIONS

International Search Report issued Sep. 9, 2008 for the corresponding international application PCT/IB2007/001867.

*Primary Examiner* — Richard M. Camby
(74) *Attorney, Agent, or Firm* — Ohlandt, Greeley, Ruggiero & Perle, L.L.P.

(57) ABSTRACT

An acquisition system for detecting the angular position of a gas knob of a motorcycle; the acquisition system is provided with: a fixed supporting body; a mobile element, which is mounted mobile in the supporting body; a transmission device, mechanically connected to the gas knob and to the mobile element for transmitting the motion from the gas knob to the mobile element itself; and a main position sensor, which is carried by the supporting body, is coupled to the mobile element for determining the angular position of the mobile element, and is designed to provide two mutually redundant measurements of the angular position of the mobile element.

26 Claims, 9 Drawing Sheets

INTEGRATED CONTROL SYSTEM FOR AN
INTERNAL-COMBUSTION ENGINE OF A
MOTORCYCLE PROVIDED WITH A GAS
KNOB AND ACQUISITION SYSTEM FOR
DETECTING THE ANGULAR POSITION OF A
KNOB FOR THE GAS OF A MOTORCYCLE

TECHNICAL FIELD

The present invention relates to an integrated control system for an internal-combustion engine of a motorcycle provided with a gas knob and to an acquisition system for detecting the angular position of a knob for the gas of a motorcycle.

BACKGROUND ART

A traditional motorcycle comprises a gas knob (conventionally the knob set to the right of the handlebar), which is rotatably mounted and is mechanically connected to a control of the engine that regulates generation of the torque. Normally, the gas knob is connected to the control of the engine by means of at least one metal cable of a Bowden type, which is inserted within an external sheath to slide with respect to the sheath itself and is pushed by a spring towards a resting position corresponding to a zero torque.

Recently, drawing upon the experience accumulated in the automotive sector, also in motorcycles there has been proposed the application of drive-by-wire (DBW) systems, in which the gas knob is no longer mechanically connected with the control of the engine, but is only connected with a position sensor that detects the position of the gas knob and consequently drives an actuator that acts mechanically on the control of the engine.

The greater problems that must be faced in the design of a DBW system suited for being used in a motorcycle is the production of an acquisition system for detecting the angular position of the gas knob. In fact, said acquisition system must be able to interpret rapidly and without any possibility of error the intention of the driver to accelerate/decelerate, must provide an information redundancy such as to render certain the interpretation of the intention of the driver by an electronic control unit for controlling the engine, and must be installable in the context of a motorcycle, taking into account the problems linked to the encumbrance, the high level of vibrations that may occur in a motorcycle, and the adverse environmental conditions linked to the absence of protection (accidental bumps, very low or very high temperature, splashes of water, etc.).

Furthermore, an acquisition system suitable for being used in a motorcycle must be extremely versatile in order to be readily integratable in motorcycles that are even very different from one another in so far as the production of motorcycles is very fragmented and characterized by a vast production of models frequently with small volumes.

In the automotive sector, there exist different solutions for making an acquisition system for detecting the position of the pedal of the gas. However, said solutions for automobiles cannot be used for a motorcycle since it is too cumbersome and not sufficiently robust. Furthermore, in motorcycle applications the reliability and rapidity in interpreting the intentions of the driver is even more important than in automobile applications in so far as an automobile resting on four wheels is intrinsically stable and hence in driving an automobile it is tolerable (i.e., it is not substantially dangerous) for there to be a brief deviation between the torque supplied and the intention of the driver. Instead, a motorcycle, given that it rests just on two wheels, is intrinsically unstable and is based upon a dynamic equilibrium that can be readily upset also by a brief deviation between the torque supplied and the intention of the driver (particularly during limit conditions, such as on a bend).

EP1338500A1 discloses a sensor for detecting a throttle grip rotation and comprising a detect shaft rotatable about an axis in conjunction with a throttle grip, a pair of rotation terminals rotatable together with the detect shaft, contact pieces disposed on each of the rotation terminals, a printed circuit including conducting pattern portions printed along sliding loci of the contact pieces and a resistance portion printed in a sliding range of the contact piece of the conducting pattern portion for generating a resistance against a current flowing in the conducting pattern portion.

EP1600320A1 discloses an accelerator opening degree detecting apparatus for a motorcycle; a shaft is rotatably supported to a fixed member, an accelerator opening degree sensor is arranged in one end of the shaft, a rotating drum is arranged in the other end, the rotating drum and an accelerator grip are coupled by a coupling member, and the accelerator grip and the rotating drum are synchronously rotated.

DISCLOSURE OF INVENTION

The aim of the present invention is to provide an integrated control system for an internal-combustion engine of a motorcycle provided with a gas knob and an acquisition system for detecting the angular position of a knob for the gas of a motorcycle that will be free from the drawbacks described above and, in particular, easy and inexpensive to produce.

According to the present invention, an integrated control system for an internal-combustion engine of a motorcycle provided with a gas knob and an acquisition system are provided for detecting the angular position of a knob for the gas of a motorcycle according to what is claimed by the annexed claims.

BRIEF DESCRIPTION OF THE DRAWINGS

The present invention will now be described with reference to the annexed plates of drawings, which illustrate some non-limiting examples of embodiment thereof, in which.

PREFERRED EMBODIMENTS OF THE INVENTION

Figure 1:
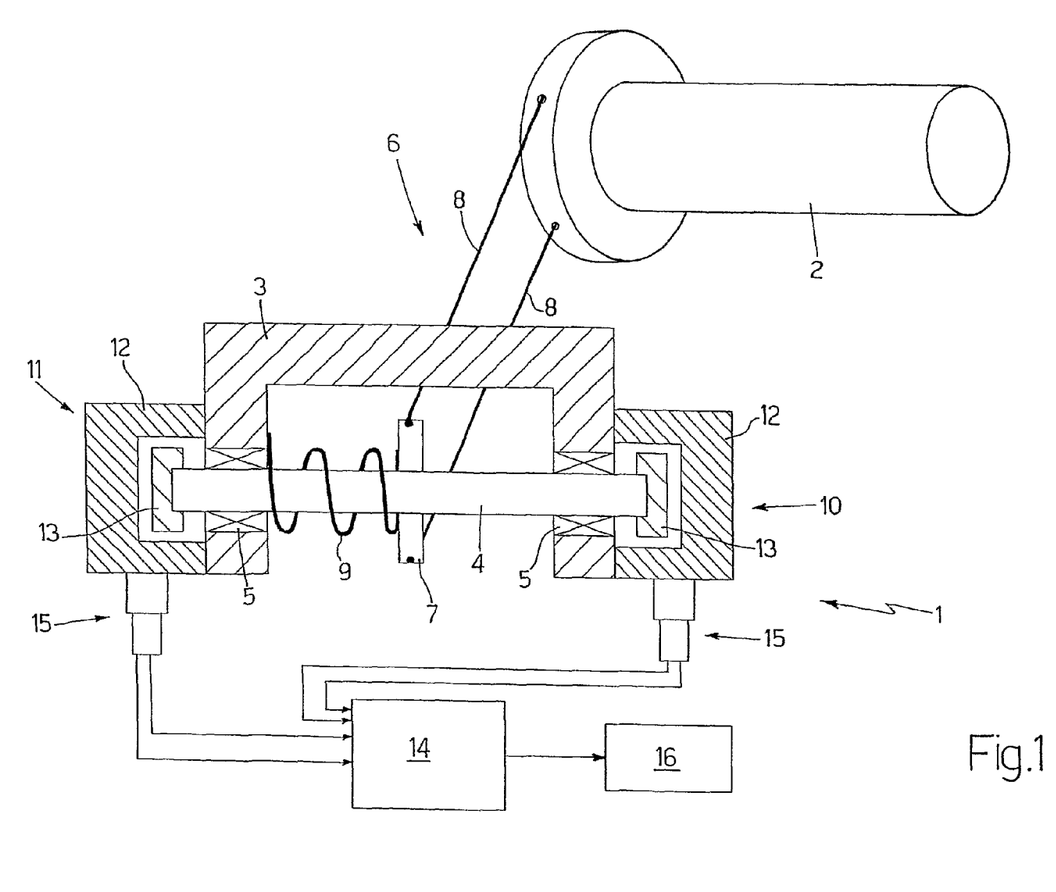
FIG. 1 is a schematic view of an acquisition system for detecting the angular position of a knob for the gas of a motorcycle built in accordance with the present invention.

In FIG. 1, the reference number 1 designates as a whole an acquisition system for detecting the angular position α of a gas knob 2 of a motorcycle for a control system of a DBW type.

The acquisition system 1 comprises a fixed supporting body 3, which is set at a certain distance from the gas knob 2 and is C-shaped. Housed in the supporting body 3 is a mobile element constituted by a rotating shaft 4, which is mounted idle by means of a pair of bearings 5 so as to be able to turn freely around a central axis of its own. The rotating shaft 4 exits from the fixed supporting body 3 at two opposite ends of the rotating shaft 4 itself and is mechanically connected to the gas knob 2 by means of a transmission device 6 that transmits motion from the gas knob 2 to the rotating shaft 4 itself.

According to the embodiment illustrated in FIG. 1, the transmission device 6 is of the cable type and comprises a sheave 7 of a push-pull type, fixed with respect to the rotating shaft 4 and a pair of cables 8 of a Bowden type (i.e., housed in a slidable way within respective external sheaths), each of which has one end constrained to the gas knob 2 and one opposite end, fixed with respect to the sheave 7. The sheave 7 is set in a position of centre of the rotating shaft 4 itself and hence is housed in a protected position within the fixed supporting body 3.

According to a different embodiment (not illustrated), the transmission device 6 is of the cable type and comprises a sheave 7 fixed with respect to the rotating shaft 4 and a single cable 8 of a Bowden type, which has one end constrained to the gas knob 2 and one opposite end fixed with respect to the sheave 7 in such a way that the gas knob 2 is rendered angularly fixed with respect to the rotating shaft 4.

According to a further embodiment (not illustrated), the rotating shaft 4 is coaxial to the knob 2, and the transmission device 6 comprises a direct mechanical connection for rendering the rotating shaft 4 angularly fixed with respect to the knob 2.

Normally, there is provided a return spring 9 set around the rotating shaft 4 for pushing with a given force the rotating shaft 4 itself towards a resting position corresponding to a zero torque.

Housed on the fixed supporting body 3 are two angular-position sensors 10 and 11 (respectively a main position sensor 10 and a control position sensor 10), which are separate from and independent of one another and are coupled to the rotating shaft 4 at the opposite ends of the rotating shaft 4 itself for determining the angular position α of the rotating shaft 4 that corresponds exactly to the angular position α of the gas knob 2 in so far as the gas knob 2 is angularly fixed with respect to the rotating shaft 4. Each position sensor 10 or 11 has a fixed part or stator 12, fixed with respect to the fixed supporting body 3, and a mobile part or slider 13, fixed with respect to the rotating shaft 4. Furthermore, each position sensor 10 or 11 is designed to provide two mutually redundant measurements of the angular position α of the rotating shaft 4; in this way, altogether four mutually redundant measurements of the angular position α of the rotating shaft 4 are supplied, and it is possible to verify proper operation of the position sensors 10 and 11, thus carrying out a self-diagnosis of the position sensors 10 and 11 themselves.

Finally, the acquisition system 1 comprises a processing unit 14, which is connected to both of the position sensors 10 and 11 and uses the signals supplied by the position sensors 10 and 11 for determining, with a high degree of certainty the angular position α of the rotating shaft 4 (i.e., of the gas knob 2). In particular, the processing unit 14 uses one of the four measurements available for determining the angular position α of the rotating shaft 4, whilst it uses all four measurements available for verifying proper operation of the position sensors 10 and 11, i.e., for verifying and validating (i.e., confirming) the angular position α of the rotating shaft 4. In other words, the processing unit 14 uses the cross comparison between the four measurements available for diagnosing any possible malfunctioning of the position sensors 10 and 11 and determines the angular position α of the gas knob 2, using at least one measurement supplied by a position sensor 10 or 11 operating properly.

For example, the processing unit 14 uses the signals supplied by the main position sensor 10 for determining the angular position α of the gas knob 2, and uses the signals supplied by the control position sensor 10 for verifying and validating the signals supplied by the main position sensor 10. Consequently, the angular position α of the gas knob 2 is determined using the signals supplied by the main position sensor 10, whilst the signals supplied by the control position sensor 10 are used for verifying and validating the signals supplied by the main position sensor 10, i.e., for diagnosing any possible malfunctioning of the main position sensor 10 that does not appear from the comparison between the two redundant outputs of the main position sensor 10 itself.

In the case of malfunctioning of the main position sensor 10, the processing unit 14 could discard the measurements supplied by the main position sensor 10 and then use the measurements supplied by the control position sensor 10 for determining the angular position α of the gas knob 2 (in this case, an emergency or recovery procedure is activated that limits the performance of the motorcycle).

According to a preferred embodiment, each position sensor 10 or 11 is connected to the processing unit 14 by means of a wiring 15 of its own (comprising connectors and cable 8) independent of the other position sensor 11 or 10. Furthermore, the connectors of the wiring 15 of the position sensor 10 can be physically different (as regards shape and/or dimensions) from the connectors of the wiring 15 of the position sensor 11 in such a way as to prevent the wiring 15 of the two position sensors 10 and 11 from possibly being erroneously reversed during assembly (i.e., reversal of the wiring 15 of the two position sensors 10 and 11 is rendered mechanically impossible). Reversal of the wiring 15 of the two position sensors 10 and 11 is very dangerous in so far as the processing unit 14 could interpret a resting position (i.e., zero torque corresponding to the operation at slow running or idling) as a position of maximum demand of performance.

The processing unit 14 communicates the angular position α of the rotating shaft 4 (i.e., of the gas knob 2) to an electronic control unit 16, which superintends the operation of an engine of the motorcycle and uses the angular position α of the rotating shaft 4 for regulating the generation of torque.

Figure 2:
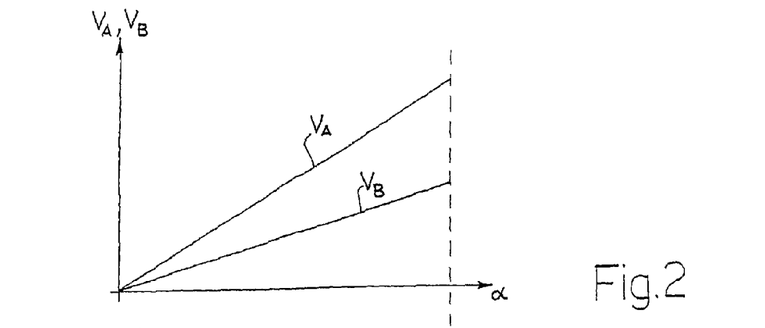
FIG. 2 is a graph of the two outputs of a first sensor of angular position of the acquisition system of FIG. 1.
Figure 3:
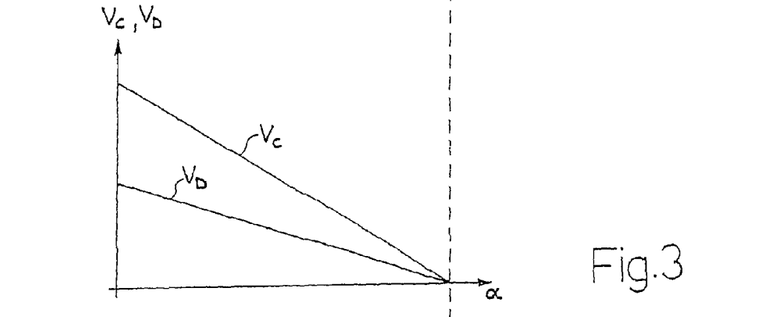
FIG. 3 is a graph of the two outputs of a second sensor of angular position of the acquisition system of FIG. 1.

According to a preferred embodiment illustrated in FIGS. 2 and 3, each position sensor 10 or 11 is a double potentiometer having two ratiometric and linear outputs in the range 0-5 V and in which a measurement $V_B$ and $V_D$ of the angular position α of the rotating shaft 4 is equal to half of the other measurement $V_A$ or $V_C$ of the angular position α of the rotating shaft 4. By way of example, the measurements $V_A$ and $V_B$ supplied by the position sensor 10 as a function of the angular position α of the rotating shaft 4 are illustrated in FIG. 2 and the measurements $V_C$ and $V_D$ supplied by the position sensor as a function of the angular position α of the rotating shaft 4 are illustrated in FIG. 3.

Preferably, the two measurements $V_C$ and $V_D$ of the angular position α of the rotating shaft 4 of the position sensor 11 follow a law different with respect to the two measurements $V_A$ and $V_B$ of the angular position α of, the rotating shaft 4 of the position sensor 10 so as to be able to highlight better any possible problems (for example, an electrical failure that determines a variation of the electrical potential of the electrical ground). Said situation is immediately evident by comparing the graph of FIG. 2 for the position sensor 10 and the graph of FIG. 3 for the position sensor 11. In other words, the measurements $V_A$ and $V_B$ of the angular position α of the rotating shaft 4 of the position sensor 10 increase as the angular position α of the rotating shaft 4 increases, whilst the measurements $V_C$ and $V_D$ of the angular position α of the rotating shaft 4 of the position sensor 11 decrease as the angular position α of the rotating shaft 4 increases, with a rate of variation equal and opposite to the rate of variation of the measurements $V_A$ and $V_B$ of the angular position α of the rotating shaft 4 of the position sensor 10. In this way, the sum of a measurement $V_A$ or $V_B$ of the angular position α of the rotating shaft 4 of the position sensor 10 remains constant with a measurement $V_C$ or $V_D$ of the angular position α of the rotating shaft 4 of the position sensor 11.

As mentioned previously, the processing unit 14 uses the cross comparison between the four measurements $V_A$, $V_B$, $V_C$ and $V_D$ available for diagnosing any possible malfunctioning of the position sensors 10 and 11. The cross comparison between the four measurements $V_A$, $V_B$, $V_C$ and $V_D$ available envisages, for example, making the following verifications:

$$V_A = 2*V_B \pm \text{Tolerance}_1 \quad [1]$$

$$V_C = 2*V_D \pm \text{Tolerance}_1 \quad [2]$$

$$V_A + V_C = K_1 \pm \text{Tolerance}_2 \quad [3]$$

$$V_B + V_D = K_2 \pm \text{Tolerance}_2 \quad [4]$$

$$2*V_B + V_C = K_3 \pm \text{Tolerance}_2 \quad [5]$$

$$2*V_D + V_A = K_4 \pm \text{Tolerance}_2 \quad [6]$$

In the equations [1]-[6] appearing above, $K_1$, $K_2$, $K_3$ and $K_4$ are verification constants linked to the constructional characteristics of the position sensors 10 and 11, whilst $\text{Tolerance}_1$ and $\text{Tolerance}_2$ are predefined threshold values that take into account the inevitable errors of measurement committed by the position sensors 10 and 11.

According to a preferred embodiment, to be able to compensate adequately for all the constructional and assembly tolerances the values of the verification constants $K_1$, $K_2$, $K_3$ and $K_4$ are not established a priori, but are determined during an initial calibration step of the acquisition system 1. In other words, the first time that the acquisition system 1 is set in operation (i.e., the very first time that the ignition key of the motorcycle that is equipped with the acquisition system 1 is turned), the acquisition system 1 goes automatically into a calibration or self-learning condition, in which the tester must get the gas knob 2 to make some rotations with the engine turned off. During these rotations, the processing unit 14 determines the effective values of the verification constants $K_1$, $K_2$, $K_3$ and $K_4$ that it will use subsequently. Preferably, the processing unit 14 determines a number of values for each verification constant $K_1$, $K_2$, $K_3$ and $K_4$ to be able to make a possibly weighted average (the last values measured may be more significant than the first values measured in so far as, during the first rotations of the gas knob 2 there may occur minor mechanical settling).

As mentioned previously, the first time that the acquisition system 1 is set in operation (i.e., the very first time that the ignition key of the motorcycle that is equipped with the acquisition system 1 is turned), the acquisition system 1 goes automatically into a calibration or self-learning condition. At the start of said calibration condition, before the tester carries out some rotations of the gas knob 2 with the engine turned off, the processing unit 14 measures the effective angular position α of the rotating shaft 4 (i.e., of the gas knob 2) corresponding to the resting position (i.e., zero torque). In other words, as soon as the ignition key is turned without switching the engine on (in any case turning-on of the engine is inhibited up to end of the calibration condition), the tester must not touch the gas knob 2 to enable the processing unit 14 to measure the effective angular position α of the rotating shaft 4 (i.e., of the gas knob 2) corresponding to the resting position (i.e., zero torque). In this way, it is possible to make up for all the constructional and assembly tolerances and moreover it is possible to verify that the assembly of the acquisition system 1 has been carried out properly. If it is verified that the assembly of the acquisition system 1 has not been carried out properly (typically as a result of a reversal of the wiring 15 of the position sensors 10 and 11), it is necessary to limit severely the performance of the engine, typically inhibiting starting or, enabling just idling of the engine.

According to a different embodiment, whenever the ignition key is turned on, the processing unit 14 measures the effective angular position α of the rotating shaft 4 (i.e., of the gas knob 2) corresponding to the resting position (i.e., zero torque) and inhibits engine ignition until the correctness of said measurement is verified, i.e., the correspondence of said measurement with an expected value.

As mentioned previously, the processing unit 14 uses the cross comparison between the four measurements $V_A$, $V_B$, $V_C$ and $V_D$ available for diagnosing any possible malfunctioning of the position sensors 10 and 11. The cross comparison between the four measurements $V_A$, $V_B$, $V_C$ and $V_D$ available envisages, for example, carrying out the verifications described in the equations [1]-[6] given above. If all the verifications are positive (i.e., if all the equations [1]-[6] are verified within the predefined tolerance margins), then the four measurements available of the angular position α of the rotating shaft 4 are all correct and equivalent. At this point, the processing unit 14 uses one of these four available measurements of the angular position α of the rotating shaft 4.

According to a preferable embodiment, the position sensor 10 is considered as the main one and in conditions of normal operation one of the measurements (always the same) supplied by the main position sensor 10 is used. To limit the costs, the auxiliary or control position sensor 11 could have a precision lower than that of the main position sensor 10. Said choice does not limit the overall performance and reliability of the acquisition system 1, but only involves an increase of the predefined threshold values $\text{Tolerance}_1$ and $\text{Tolerance}_2$ present in the equations [1]-[6] given above.

According to a different embodiment, for determining the measurement of the angular position α of the rotating shaft 4 the processing unit 14 performs an arithmetic mean between the two measurements $V_A$ and $V_B$ supplied by the main position sensor 10 (if the two position sensors 10 and 11 have different precision), or else performs an arithmetic mean between the four measurements $V_A$, $V_B$, $V_C$ and $V_D$ supplied by the main position sensors 10 and 11 (if the two position sensors 10 and 11 have the same precision).

If the verifications performed by the processing unit 14 are not all positive (i.e., if not all the equations [1]-[6] are verified within the predefined tolerance margins), then the processing unit 14 identifies the potentiometer or potentiometers that has/have failed of the position sensors 10 and 11 and excludes the measurement (or measurements) $V_A$, $V_B$, $V_C$ and $V_D$ corresponding to the potentiometer or potentiometers that has/have failed of the position sensors 10 and 11. Furthermore, in the event of failure in the position sensors 10 and 11, the processing unit 14 activates a condition of emergency (referred to also as recovery condition), in which the performance of the engine is limited in a way increasing as a function of the increase in the number of potentiometers failed of the position sensors 10 and 11. In the case of failure of just one potentiometer of the position sensors 10 and 11, the performance of the engine is slightly limited, enabling travel at a speed slightly lower than the nominal performance (for example, it is not possible to exceed 130 km/h). In the case of failure of two potentiometers of the position sensors 10 and 11 the performance of the engine is limited, enabling travel at a much lower speed with respect to the nominal performance (for example, it is not possible to exceed 50 km/h). In the case of failure of three potentiometers of the position sensors 10 and 11 the performance of the engine is markedly limited, only enabling operation at a constant r.p.m. (for example, at idling or at an r.p.m. slightly higher than that of idling), i.e., the motorcycle can travel at a very contained speed. It should be emphasized that in the case of failure of three potentiometers of the position sensors 10 and 11 it is not possible to determine with certainty whether three or four potentiometers have failed and which potentiometer has not failed. Consequently, the choice is made to ignore the signal supplied by the gas knob 2 and to keep the engine at a constant r.p.m.

For example, in the case of electrical failure of the potentiometer of the position sensor 10 that supplies the measurement $V_A$, the equations [1], [3] and [6] are not verified, whilst the equations [2], [4] and [5] are verified. Consequently, if the processing unit 14 determines that the equations [1], [3] and [6] are not verified whilst the equations [2], [4] and [5] are verified, then the processing unit 14 diagnoses a failure of the potentiometer of the position sensor 10 that supplies the measurement $V_A$ and in no way uses the measurement $V_A$ for determining the angular position α of the rotating shaft 4 (i.e., of the gas knob 2).

For instance, in the case of electrical failure of both of the potentiometers of the position sensor 10 or in the case of mechanical failure of the position sensor 10, the measurements $V_A$ and $V_B$ are wrong and hence the equations [1], [3]-[6] are not verified, whilst only the equation [2] is verified. Consequently, if the processing unit 14 determines that the equations [1], [3]-[6] are not verified whilst only the equation [2] is verified, then the processing unit 14 diagnoses a failure of the position sensor 10 and in no way uses the measurements $V_A$ and $V_B$ for determining the angular position α of the rotating shaft 4 (i.e., of the gas knob 2).

In the event of failure of at least three potentiometers of the position sensors 10 and 11, none of the equations [1]-[6] is verified; consequently, if the processing unit 14 determines that the equations [1]-[6] are not verified, then the processing unit 14 diagnoses a failure of at least three potentiometers of the position sensors 10 and 11. It should be noted that in this case, the processing unit 14 is not able to determine with certainty which potentiometer of the position sensors 10 and 11 is functioning and in any case has no possibility of controlling the correctness of the measurement supplied by the potentiometer that has not failed.

In the embodiment described above, the position sensors 10 and 11 are double potentiometers and hence in said position sensors 10 and 11 there exists a mechanical connection between the stator 12 and the slider 13. According to a different embodiment, the position sensors 10 and 11 are of a contactless type; i.e., no mechanical contact is provided between the stator 12 and the slider 13, which are electromagnetically coupled together. For example, the slider could comprises a shaped turn (typically provided with lobes) or else a permanent magnet and the stator could comprise a double slider sensitive to the variations of the electromagnetic field, designed to provide two mutually redundant measurements of the angular position of the slider 13.

Figure 4:
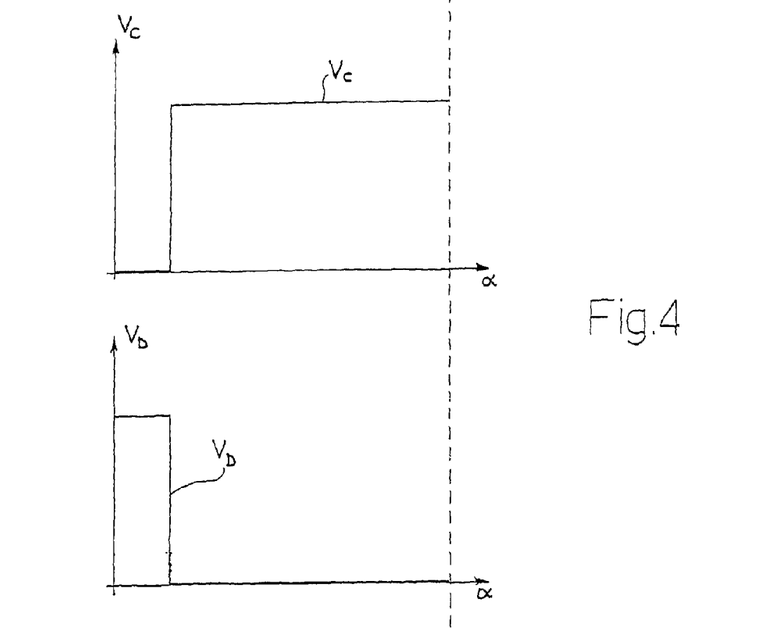
FIG. 4 is a graph of the two outputs of the second sensor of angular position of the acquisition system of FIG. 1 according to an alternative embodiment.
Figure 5:
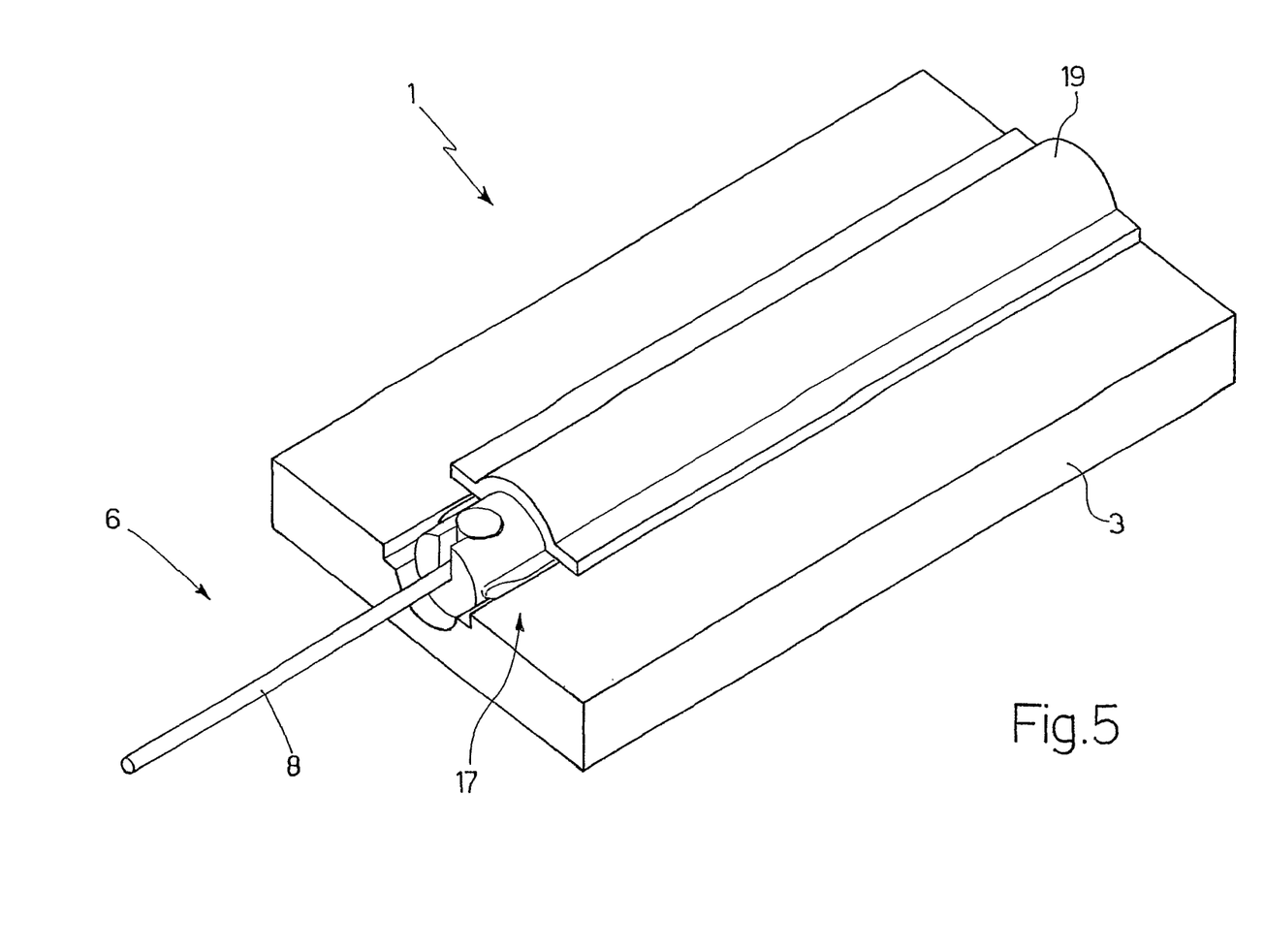
FIG. 5 is a schematic and perspective view of a further embodiment of an acquisition system for detecting the angular position of a knob for the gas of a motorcycle built in accordance with the present invention.
Figure 6:
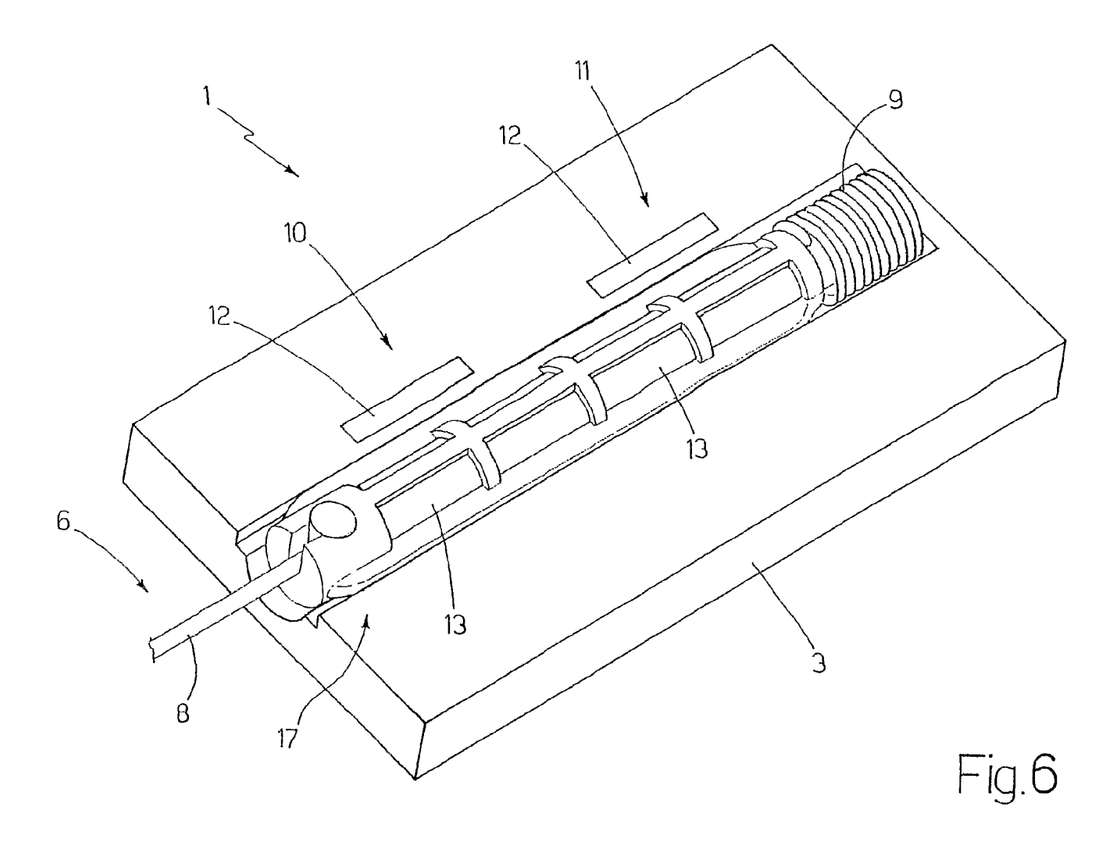
FIGS. 6, 7 and 8 are schematic and perspective views of parts of the acquisition system of FIG. 5.
Figure 7:
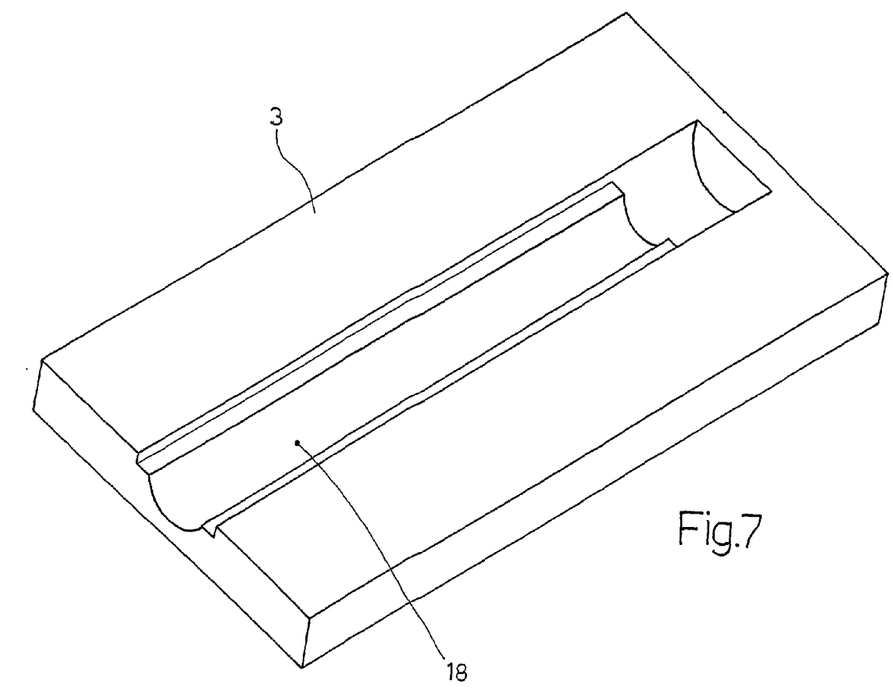
Figure 8:
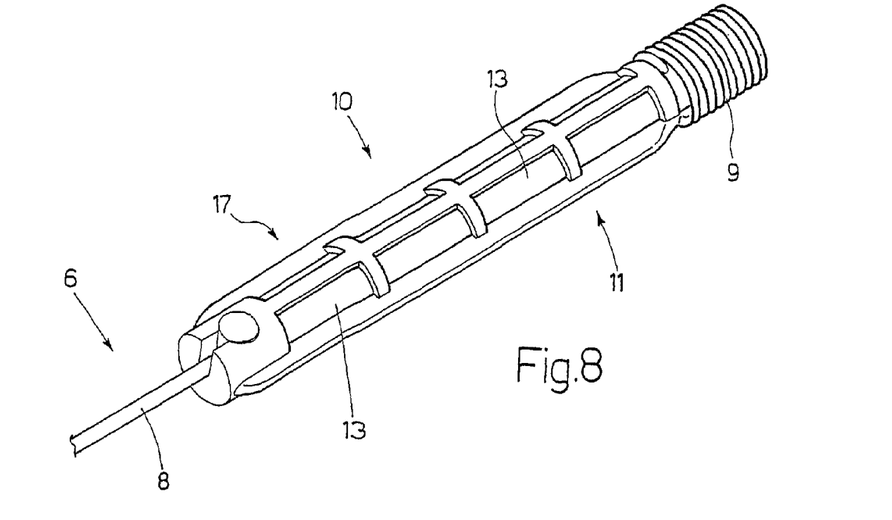

According to an alternative embodiment illustrated in FIG. 4, the control position sensor 10 has one or two mutually redundant outputs of a digital type (i.e., of the 0 1 type), which indicate whether the rotating shaft 4 is or not in the neighbourhood of a given angular position α. By way of example, the measurements $V_C$ and $V_D$ supplied by the control position sensor 10 as a function of the angular position α of the rotating shaft 4 are illustrated in FIG. 4. Preferably, the two outputs of a digital type of the control position sensor 10 indicate whether the rotating shaft 4 (i.e., the gas knob 2) is or not in the neighbourhood of an angular resting position α corresponding to a zero torque. Said angular resting position α is all the more important in so far as the biggest danger in the case of malfunctioning of a DBW system is not realizing that the driver requires cancelling of generation of torque, and hence accelerating the motorcycle against the intention of the driver. In the case where the control position sensor 10 has one or two outputs of a digital type, the control position sensor 10 could be mechanically coupled directly to the gas knob 2, instead of being mechanically coupled to the rotating shaft 4.

Obviously, when the control position sensor 10 has two outputs of a digital type, the processing unit 14 uses the signals supplied by the main position sensor 10 for determining the angular position α of the gas knob 2, and uses the signals supplied by the control position sensor 10 for verifying and validating the signals supplied by the main position sensor 10. Hence, the angular position α of the gas knob 2 is determined using the signals supplied by the main position sensor 10, whilst the signals supplied by the control position sensor 10 are used for verifying and validating the signals supplied by the main position sensor 10, i.e., for diagnosing any possible malfunctioning of the main position sensor 10 that does not appear from the comparison between the two redundant outputs of the main position sensor 10 itself.

The acquisition system 1 described above presents numerous advantages in so far as it is simple and inexpensive to produce, is extremely flexible in so far as it can be easily installed on any type of motorcycle, and interfaces with a gas knob 2 of a traditional type, thus reducing the investments necessary for its implementation. In particular, the acquisition system 1 described above enables maintenance of a gas knob 2 of a traditional type having a cable connection 8 (well proven and reliable). Consequently, the supporting body 3 can be installed in a very protected area both with respect to possible falls or accidental bumps and with respect to atmospheric and environmental agents. Furthermore, the acquisition system 1 described above guarantees a standard solution for a DBW motorcycle system and integrates in a single object all the functions of "gas demand" and all the redundancies required by safety.

Furthermore, the acquisition system 1 described above enables a precise and above all very reliable measurement of the angular position α of the rotating shaft 4 (i.e., of the gas knob 2) to be obtained, and even in the event of limited failure of the position sensors 10 and 11 enables travel of the motorcycle in conditions of a high level of safety.

In the embodiment illustrated in FIG. 1, the acquisition system 1 comprises a mobile element, which is constituted by the rotating shaft 4 and is mechanically connected to the gas knob 2 by means of the transmission device 6 that transmits the motion from the gas knob 2 to the rotating shaft 4 itself. In the embodiment illustrated in FIGS. 5-8, the rotating shaft 4, which constitutes a mobile element, is replaced by a slide 17, which is slidably mounted in the supporting body 3. In this case, the position sensors 10 and 11 determine the linear position of the slide 17 with respect to the supporting body 3.

The slide 17 supports the two rotors 13 of the position sensors 10 and 11, whilst the two stators 12 of the position sensors 10 and 11 are carried by the supporting body 3. Alternatively, the position sensors 10 and 11 could share a single common slider 13; in other words, the position sensors 10 and 11 each have a respective stator 12, which reads the position of a single common slider 13.

According to what is illustrated in FIGS. 5-8, the supporting body 3 has a seat 18, within which the slide 17 slides. The function of the seat 18 (which can be closed at the top by a lid 19, illustrated in FIG. 5) is both to contain the slide 17, guiding the movement of the slide 17, and to define the limit positions (i.e., the end-of-travel) of the slide 17.

According to the embodiment illustrated in FIGS. 5-8, the acquisition system 1 comprises a single return spring 9, which pushes the slide 17 with a given force towards a resting position corresponding to a zero torque. According to a variant (not illustrated), the acquisition system 1 comprises a pair of return springs 9, which are set on opposite sides of the slide 17 and are calibrated for pushing as a whole with a given force the slide 17 towards a resting position corresponding to a zero torque.

Figure 9:
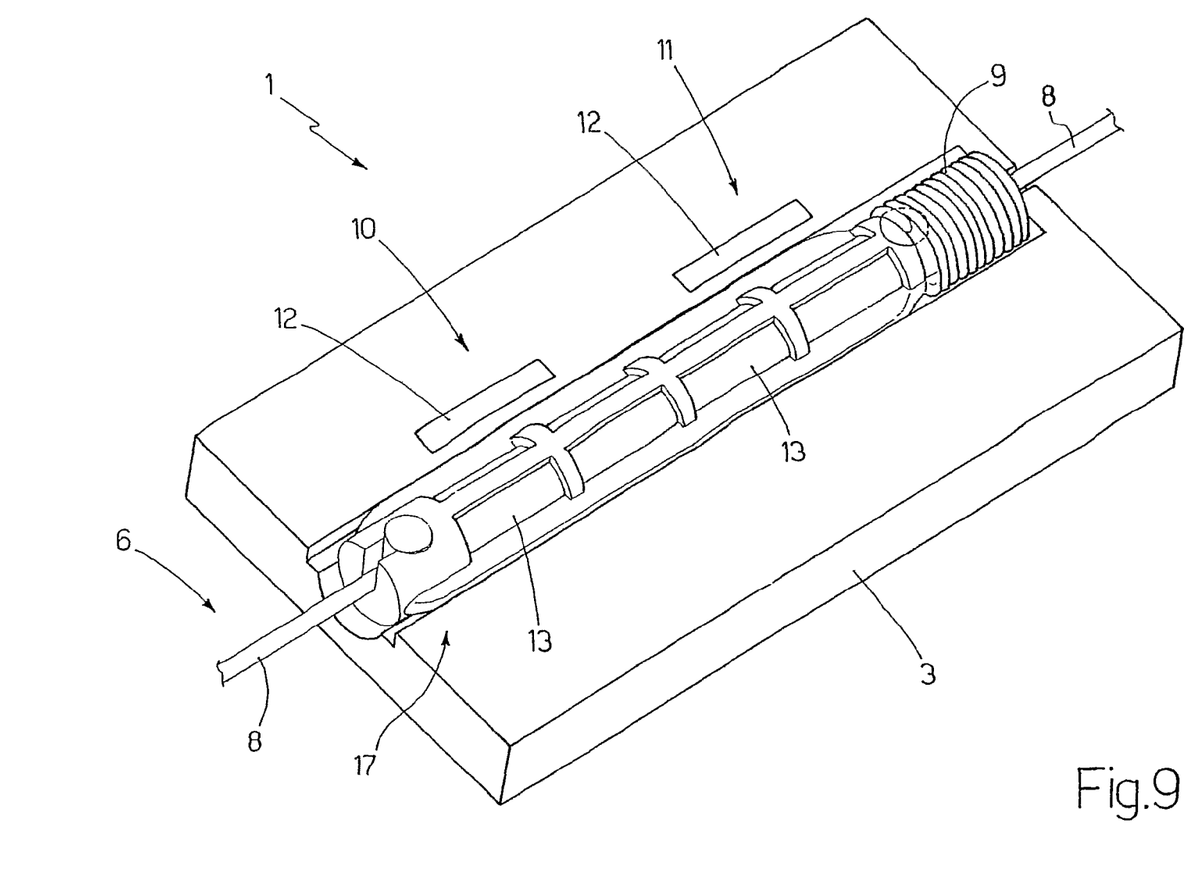
FIG. 9 is a schematic and perspective view of a variant of the acquisition system of FIG. 5.

According to the embodiment illustrated in FIGS. 5-8, the transmission device 6 is of the cable type and comprises a cable 8 of a Bowden type, which has one end constrained to the gas knob 2 and one opposite end, fixed to the slide 17. According to the variant illustrated in FIG. 9, the transmission device 6 is of the cable type and comprises a pair of cables 8 of a Bowden type, each of which has one end constrained to the gas knob 2 and one opposite end, fixed with respect to the slide 17.

Figure 10:
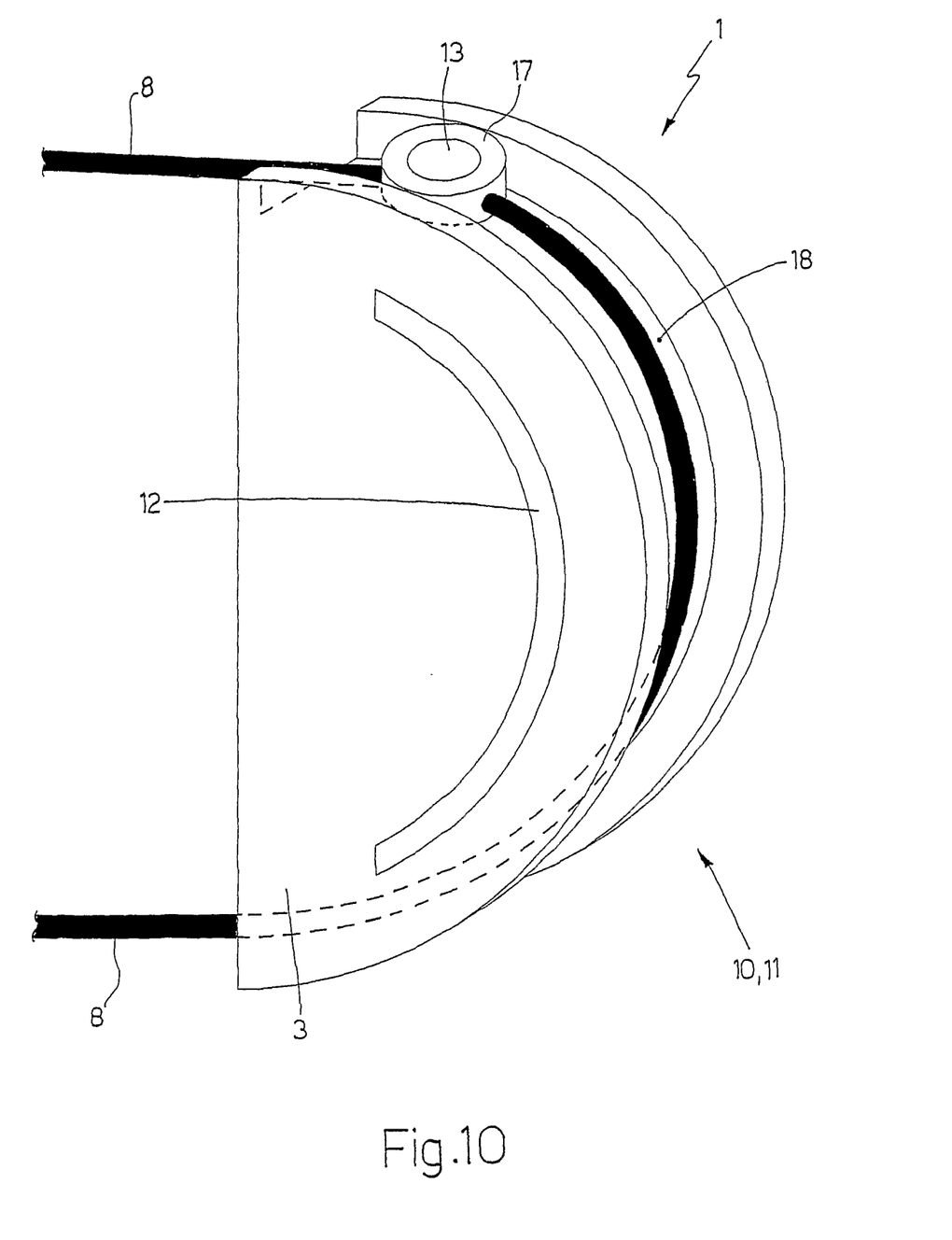
FIG. 10 is a schematic view of a further variant of the acquisition system of FIG. 5.

According to the embodiment illustrated in FIGS. 5-8, the slide 17 slides along a linear path. According to the variant schematically illustrated in FIG. 10, the slide 17 slides along a circular path. In this case, the slide 17 has a reduced dimension to be able to follow a circular path defined by the seat 18, which is made in the supporting body 3 and is shaped like the arc of a circle.

The acquisition system 1 described above presents numerous advantages, in so far as it is simple and inexpensive to produce, is extremely flexible in so far as it can be easily installed in any type of motorcycle, and interfaces with a gas knob 2 of a traditional type, thus reducing the investments necessary for its implementation. In particular, the acquisition system 1 described above enables maintenance of a gas knob 2 of a traditional type having a cable connection (well proven and reliable). Consequently, the supporting body 3 can be installed in a very protected area both with respect to possible falls or accidental bumps and with respect to atmospheric and environmental agents. Furthermore, the acquisition system 1 described above guarantees a standard solution for a DBW motorcycle system and integrates in a single object all the functions of "gas demand" and all the redundancies required by safety.

Figure 11:
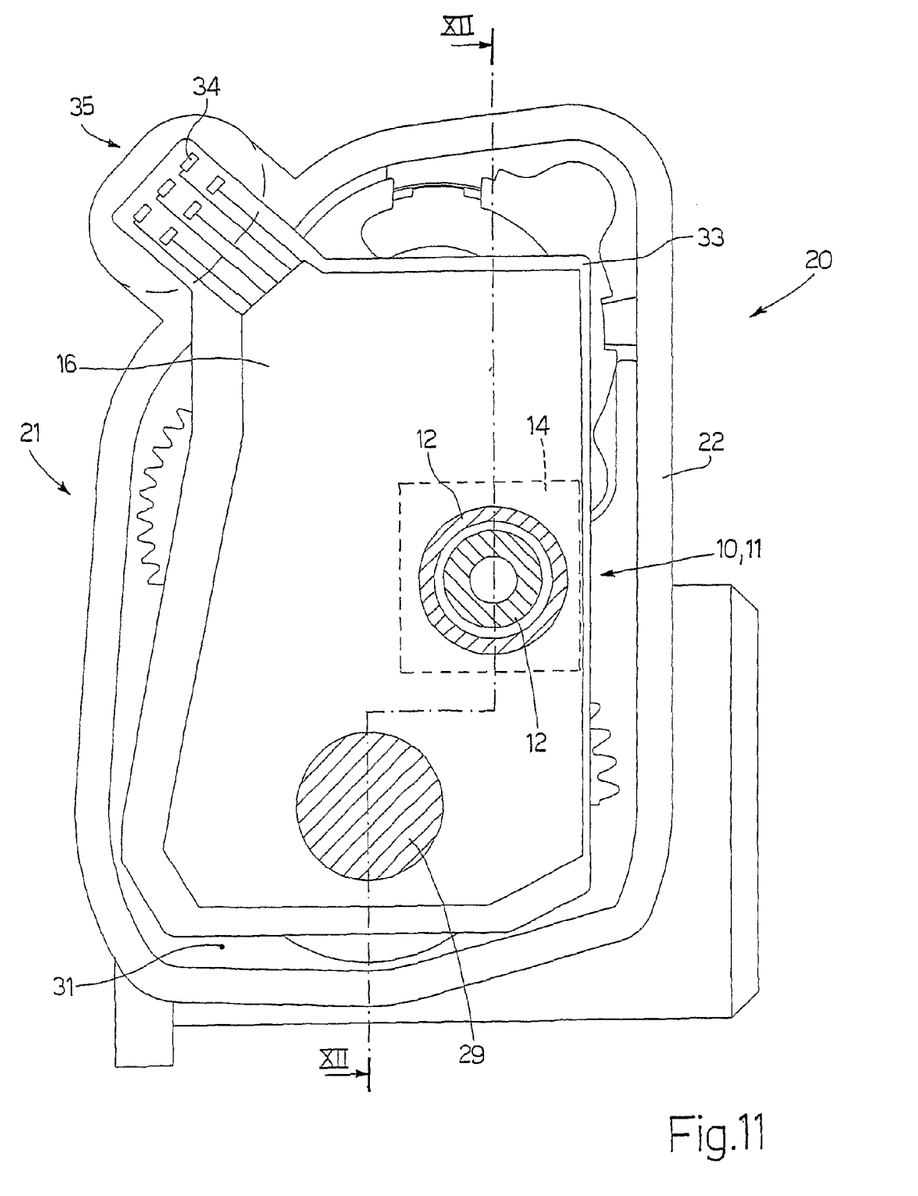
FIG. 11 is a schematic front view with parts removed for reasons of clarity of an integrated control system for an internal-combustion engine of a motorcycle provided with an acquisition system for detecting the angular position of a knob for the gas of a motorcycle, built in accordance with the present invention.
Figure 12:
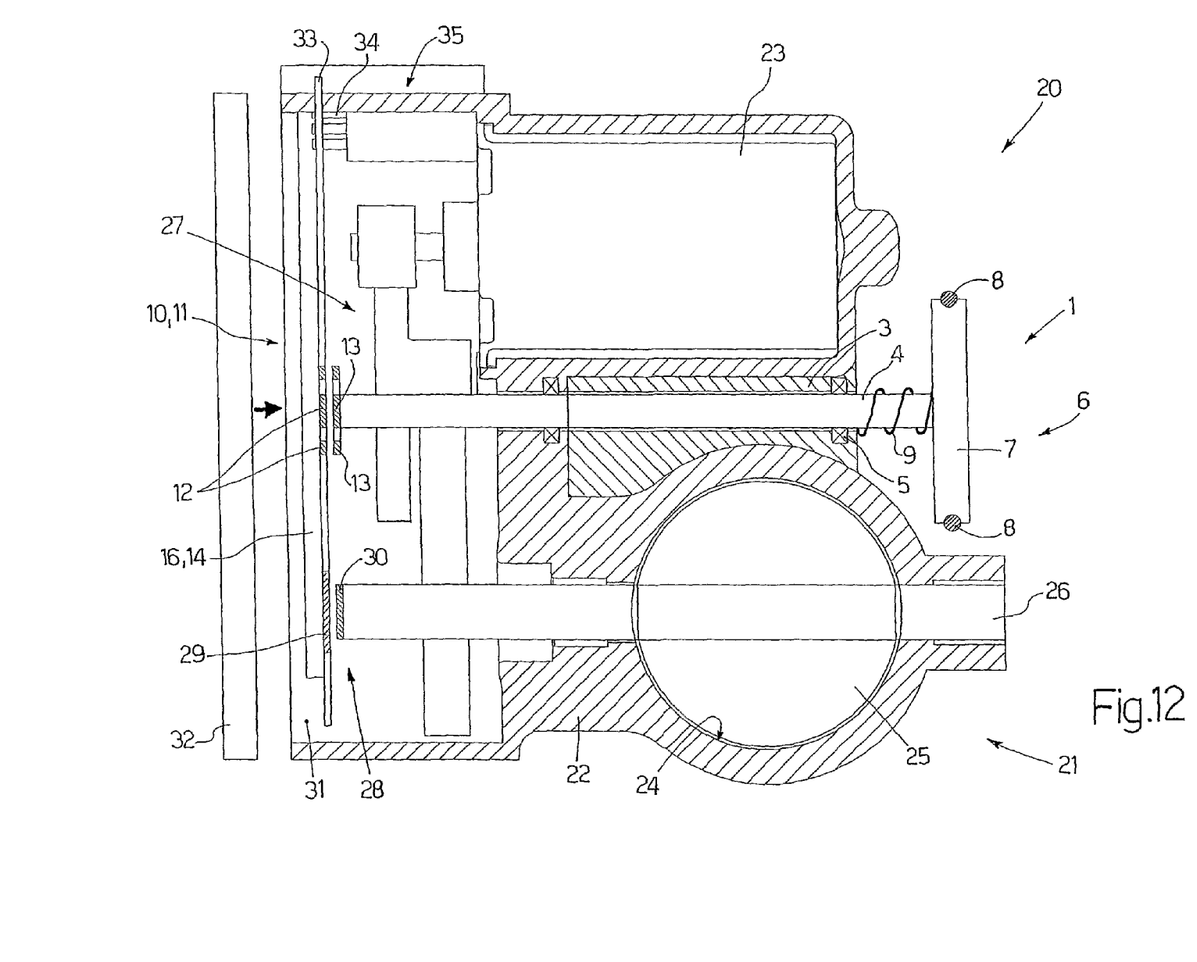
FIG. 12 is a cross-sectional view according to the line XII-XII and with parts removed for reasons of clarity of the integrated control system of FIG. 1.

In FIGS. 11 and 12, the number 1 designates as a whole an integrated control system 20 for an internal-combustion engine of a motorcycle provided with a gas knob 2. The integrated control system 20 comprises: a throttle valve 21 that regulates the flowrate of the air taken in by the engine; an acquisition system 1 that detects the angular position α of the gas knob 2 of the type described above; and an electronic control unit 16 that superintends operation of the internal-combustion engine and controls generation of torque as a function of the angular position α of the gas knob 2 driving the throttle valve 21 and fuel injection.

The throttle valve 21 comprises a valve body 22, defined in which is a cylindrical tubular duct that constitutes a channel for the passage of the air taken in by the internal-combustion engine. The valve body 22 houses within it an electric motor 23, a valve seat 24 made along the channel for passage of the air, and an open/close element constituted by a throttle-valve cap 25 that engages the valve seat 24 and displaces between a position of opening and a position of closing of the valve seat 24 itself as a result of the action of the electric motor 23. In particular, the throttle-valve cap 25 is fitted on of a shaft 26, which is rotatably mounted within the valve body 22 and is mechanically connected to the electric motor 23 by means of a gear transmission 27.

The throttle valve 21 moreover comprises an inductive position sensor 28 of a contactless type, which is coupled to the shaft 26 and is designed to detect the angular position of the shaft 26 and hence of the throttle-valve cap 25 to enable a feedback control of the position of the throttle-valve cap 25 itself. The position sensor 28 is of the type described in the U.S. Pat. No. 6,236,199B21 and comprises a stator 29 and a slider 30, which is fixed with respect to the shaft 26 and is set facing the stator 29.

The valve body 22 has a housing chamber 31, which is sealed by means of a lid 32 that can be removed and houses the electric motor 23, the gear transmission 27, the position sensor 28, the electronic control unit 16, and part of the acquisition system 1. In particular, set within the housing chamber 31 is a rigid plate 33, which is mechanically connected to the valve body 22 by means of a plurality of screws and supports the electronic control unit 16 and the electrical terminals 34 of an electrical connector 35 for electrical connection of the electronic control unit 16 to the electrical system of the internal-combustion engine. The electronic control unit 16 integrates within it the stator 29 of the position sensor 28 and is electrically connected to the electric motor 23 for driving the electric motor 23 itself.

Furthermore, the acquisition system 1 that detects the angular position α of the gas knob 2 is integrated within the valve body 22 of the throttle valve 21. In particular, the fixed supporting body 3 of the acquisition system 1 forms an integral part of the valve body 22 of the throttle valve 21 and the electronic control unit 16 integrates within it both the stators 13 of the position sensors 10 and 11 and the processing unit 14.

In the embodiment illustrated in FIGS. 11 and 12, the mobile element of the acquisition system 1 is constituted by a rotating shaft 4, taking up the embodiment illustrated in FIG. 1. Obviously, the mobile element of the acquisition system 1 could be constituted by a slide 17, taking up the embodiment illustrated in FIGS. 5-10.

The integrated control system 20 presents numerous advantages in so far as it is extremely economical and compact thanks to its high level of integration, enables considerable reduction of the assembly times of the internal-combustion engine, and at the same time is also very sturdy in so far as it reduces to a minimum the external electrical wiring (which, in a motorcycle, is always potentially subject to failures or malfunctioning in so far as it is not very well protected). It should be emphasized that the extreme compactness of the integrated control system 20 enables use of a drive-by-wire (DBW) system also in an existing motorcycle, without the need to redesign the arrangement of the components. This characteristic is extremely important in so far as motorcycles do not have free spaces that can be used for new components and redesigning of the arrangement of the components is always extremely costly.

The invention claimed is:

1. An integrated control system for an internal-combustion engine of a motorcycle provided with a gas knob; the integrated control system comprises:
   a throttle valve that regulates the flowrate of the air taken in by the engine and comprises a valve body having a housing chamber;
   an acquisition system that detects the angular position ($\alpha$) of the gas knob; and
   an electronic control unit that drives the throttle valve as a function of the angular position ($\alpha$) of the gas knob;
   wherein the acquisition system comprises:
   a fixed supporting body that forms an integral part of the valve body of the throttle valve;
   a mobile element, which is mounted mobile in the supporting body;
   a transmission device, mechanically connected to the gas knob and to the mobile element for transmitting the motion from the gas knob to the mobile element itself; and
   a main position sensor, which is carried by the supporting body, is coupled to the mobile element for determining the angular position ($\alpha$) of the mobile element, and is designed to provide two mutually redundant measurements of the angular position ($\alpha$) of the mobile element;
   wherein the electronic control unit is housed within the valve body of the throttle valve and is supported by a rigid plate mechanically connected to the valve body.

2. The integrated control system according to claim 1, wherein the throttle valve comprises:
   a cylindrical tubular duct made within the valve body and defined in which is a channel for the passage of the air;
   a valve seat, made along the channel for the passage of the air of the tubular duct;
   an actuation system, driven by the electronic control unit; and
   an open/close element, which engages the valve seat, and is mobile between a position of opening and a position of closing of the valve seat, under the thrust of the actuation system.

3. The integrated control system according to claim 1, wherein the acquisition system comprises a processing unit, which is connected to the main position sensor and is integrated in the electronic control unit.

4. The integrated control system according to claim 1, wherein the main position sensor comprises a slider, fixed with respect to the mobile element, and a stator integrated in the electronic control unit.

5. The integrated control system according to claim 1, further comprising a control-position sensor, which is separate from and independent of the main position sensor, is carried by the supporting body, is coupled to the mobile element for determining the position of the mobile element, and is designed to provide two mutually redundant measurements of the position of the mobile element.

6. The integrated control system according to claim 5, wherein the control position sensor comprises a slider, fixed with respect to the mobile element, and a stator integrated in the electronic control unit.

7. The acquisition system according to claim 6, further comprising a processing unit, which is connected to both of the main position sensor and the control-position sensor, uses the signals supplied by the position sensors for making a cross comparison between the four measurements for diagnosing any possible malfunctioning of the position sensors, and determines the angular position ($\alpha$) of the gas knob, using at least one measurement supplied by the main position sensor or the control-position sensor operating properly.

8. The integrated control system according to claim 7, wherein the processing unit is integrated in the electronic control unit.

9. The integrated control system according to claim 1, wherein the throttle valve comprises a position sensor of the open/close element for determining the position of the open/close element and being connected to the electronic control unit.

10. The integrated control system according to claim 9, wherein the position sensor of the open/close element comprises a slider fixed with respect to the open/close element and a stator integrated in the electronic control unit.

11. The integrated control system according to claim 1, wherein the rigid plate is mechanically connected to the valve body by means of a plurality of screws.

12. The integrated control system according to claim 1, wherein the rigid plate supports electrical terminals of an electrical connector for electrical connection of the electronic control unit to an electrical system of the internal-combustion engine.

13. An acquisition system for detecting the angular position ($\alpha$) of a gas knob of a motorcycle; the acquisition system comprises:
   a fixed supporting body;
   a mobile element, which is mounted mobile in the supporting body;
   a transmission device, mechanically connected to the gas knob and to the mobile element for transmitting the motion from the gas knob to the mobile element itself; and
   a main position sensor, which is carried by the supporting body, is coupled to the mobile element for determining the angular position ($\alpha$) of the mobile element, and is designed to provide two mutually redundant measurements of the angular position ($\alpha$) of the mobile element;
   wherein the mobile element is constituted by a slide, which is slidably mounted in the supporting body; the main position sensor determines the linear position of the slide with respect to the supporting body.

14. The acquisition system according to claim 13, further comprising a control-position sensor, which is separate from and independent of the main position sensor, is carried by the supporting body, is coupled to the mobile element for determining the position of the mobile element, and is designed to provide two mutually redundant measurements of the position of the mobile element.

15. The acquisition system according to claim 14, further comprising a processing unit, which is connected to both of the main position sensor and the control position sensor, uses the signals supplied by the main position sensor and the control-position sensor for making a cross comparison between the four measurements for diagnosing any possible malfunctioning of the main position sensor and the control-position sensor, and determines the angular position (α) of the gas knob, using at least one measurement supplied by a main position sensor and a control-position sensor operating properly.

16. The acquisition system according to claim 15, wherein the processing unit uses the signals supplied by the main position sensor for determining the angular position (α) of the gas knob, and uses the signals supplied by the control-position sensor for verifying and validating the signals supplied by the main position sensor.

17. The acquisition system according to claim 14, wherein the control-position sensor has two outputs of a digital type that indicates whether the rotating shaft is or not proximate a given position.

18. The acquisition system according to claim 17, wherein the control-position sensor has two outputs of a digital type that indicate whether the rotating shaft is or not proximate a resting position corresponding to a zero torque.

19. The acquisition system according to claim 14, wherein the two measurements of the position of the mobile element of the control-position sensor follow a law different with respect to the two measurements of the position of the mobile element of the main position sensor.

20. The acquisition system according to claim 13, wherein at least one return spring is provided, coupled to the mobile element for pushing with a given force the mobile element itself towards a resting position corresponding to a zero torque.

21. The acquisition system according to claim 13, wherein the supporting body has a seat, within which the slide slides.

22. The acquisition system according to claim 21, wherein the transmission device is of the cable type and comprises a pair of cables of a Bowden type, each of which has one end constrained to the gas knob and one opposite end, fixed with respect to the slide.

23. The acquisition system according to claim 21, wherein the transmission device is of the cable type and comprises a cable of a Bowden type, which has one end constrained to the gas knob and one opposite end, fixed with respect to the slide.

24. The acquisition system according to claim 13, wherein the slide slides along a linear path.

25. The acquisition system according to claim 13, wherein the slide slides along a circular path.

26. The acquisition system according to claim 13, wherein the supporting body forms an integral part of a valve body of a throttle valve that regulates the flowrate of the air taken in by an internal-combustion engine of the motorcycle.

* * * * *